United States Patent [19]

Hardigg

[11] Patent Number: 4,757,665

[45] Date of Patent: Jul. 19, 1988

[54] TRUSS PANEL

[75] Inventor: James S. Hardigg, Conway, Mass.

[73] Assignee: Hardigg Industries, Inc., South Deerfield, Mass.

[21] Appl. No.: 61,037

[22] Filed: Jun. 12, 1987

Related U.S. Application Data

[63] Continuation of Ser. No. 302,561, filed as PCTUS79/01110 on Dec. 19, 1979, published as WO81/01807 on Jul. 9, 1981, abandoned, which is a continuation-in-part of Ser. No. 759,233, Jan. 13, 1977, Pat. No. 4,180,232.

[51] Int. Cl.⁴ .............................................. E04C 2/30
[52] U.S. Cl. ........................................ 52/782; 52/793
[58] Field of Search .................. 52/782, 785, 309.1, 52/800, 793, 799

[56] References Cited

U.S. PATENT DOCUMENTS

| | | | |
|---|---|---|---|
| 2,970,553 | 2/1961 | Allen | 52/800 X |
| 3,046,638 | 7/1962 | Melzer | 52/793 X |
| 3,376,684 | 4/1968 | Cole et al. | 52/799 |
| 3,869,778 | 3/1975 | Yancey | 52/800 |
| 4,180,232 | 12/1979 | Hardigg | 249/60 |
| 4,530,197 | 7/1985 | Rainville | 52/799 X |

FOREIGN PATENT DOCUMENTS

| | | | |
|---|---|---|---|
| 810187 | 8/1951 | Fed. Rep. of Germany | 52/793 |
| 1184705 | 7/1959 | France | 52/800 |
| 395540 | 7/1933 | United Kingdom | 52/793 |
| 839249 | 6/1960 | United Kingdom | 52/793 |

*Primary Examiner*—J. Karl Bell
*Attorney, Agent, or Firm*—Cushman, Darby & Cushman

[57] ABSTRACT

A method and apparatus is disclosed for forming integrated truss structures wherein the molding apparatus includes a plurality of alternating male mold members (17) and female mold members (29) arranged in two opposed layers or mold halves. The male mold members each have a plurality of open grooves (19, 19') formed therein which are disposed orthogonally therein and slope away from a top or plateau surface (21) thereof. Each of the female mold members (29) has a centrally located, generally circular recessed cavity (31) with a plurality of open grooves (33, 33') which are orthogonally disposed with regard to one another and which slop away from the plane of the recessed cavity (31). When the two layers each including male (17) and female (29) members are positioned opposite one another, the open grooves (19, 33) in opposed male and female members become aligned to define strut beam chambers (51) and plateau surface (21) of the male member is aligned with the recessed cavity (31) of the female member to define a junction chamber (53). Thus, a plurality of strut beam chambers (51) slope away from each junction chamber (53). When the mold halves are brought together they define between them alternate symmetrical upper and lower junction chambers interconnected by a plurality of strut chambers. Channels are formed preferably in the female members, for injecting a moldable material such as plastic into the struct beam chambers and the junction chambers. After injection occurs, the molds are separated to thereby form an integrally molded truss structure. The resulting integrated truss structures can be incorporated with exterior or interiorly mounted members to make composite truss panel structures having a wide variety of uses. The present invention also concerns techniques for securing such members to or within truss structures and the composite structures produced thereby.

19 Claims, 13 Drawing Sheets

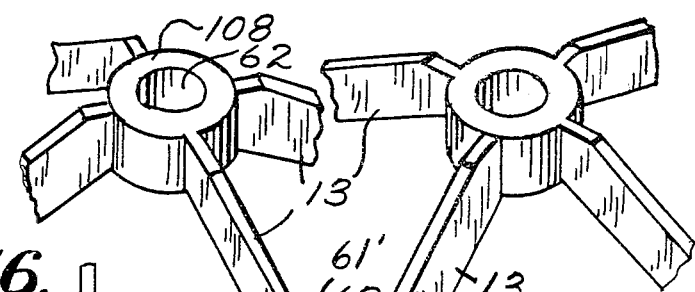
Fig. 16.
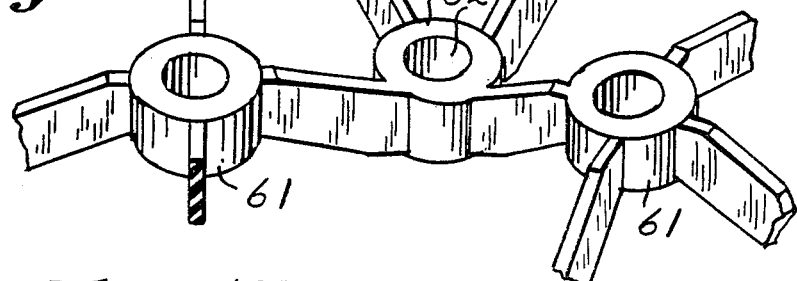
Fig. 17.
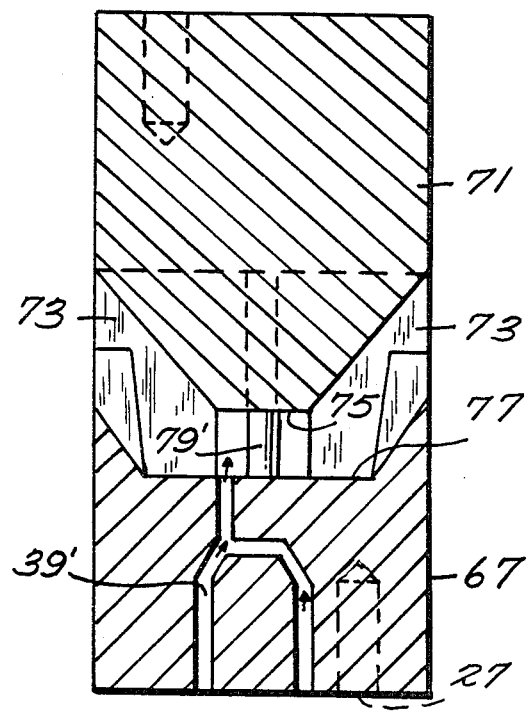

Fig. 24.
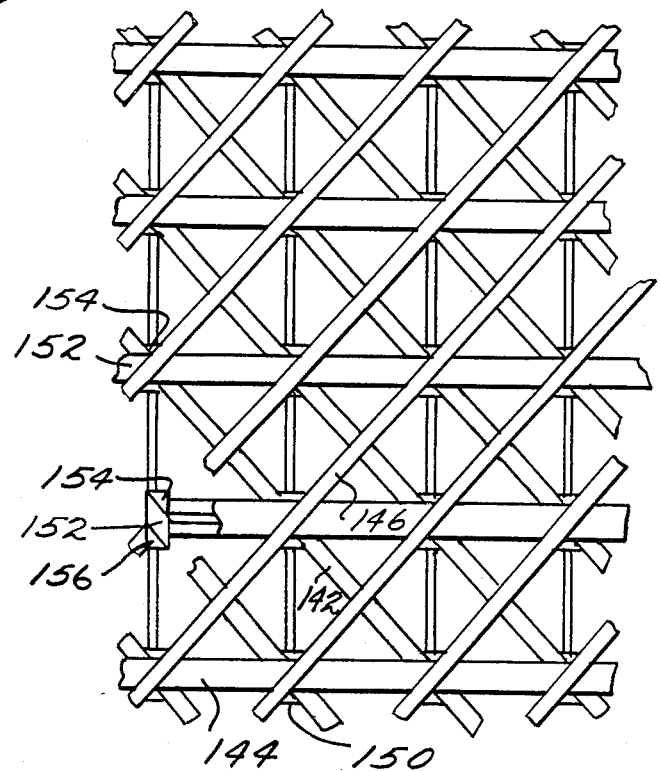
Fig. 25.
Fig. 26.
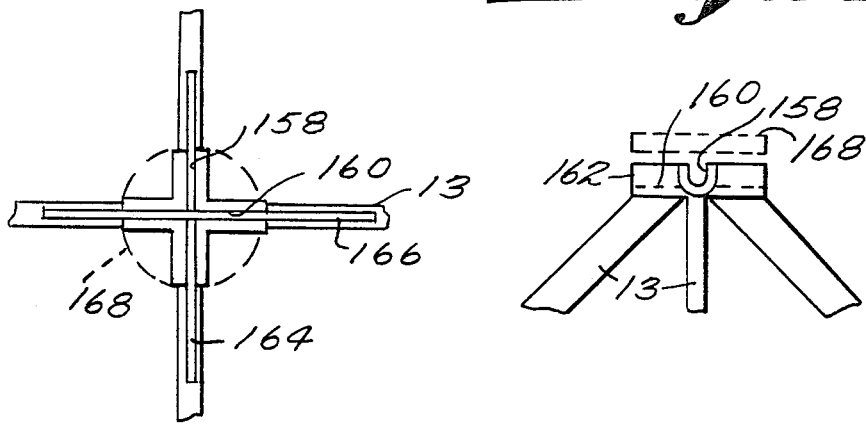

TRUSS PANEL

This is a continuation of application Ser. No. 302,561, filed as PCT US79/01110 on Dec. 19, 1979, published as WO81/01807 on Jul 9, 1981, now abandoned, which is a CIP of Ser. No. 05/759,233, filed Jan. 13, 1977, now U.S. Pat. No. 4,180,232.

BACKGROUND OF THE INVENTION

The present invention relates to a method and apparatus of forming moldable integrated truss structures and to composite structures resulting from incorporating such truss structures between outer framing elements, sheets, skins or by incorporating strengthing structures within the truss structures.

Numerous efforts have been made in the past for providing improved truss structures and for reducing the time and expense involved in manufacturing such truss structures. As is known in the art, truss structures typically are utilized to provide support for a thin material such as a metallic skin, a floor, roof or wall or other such surface which is not capable by itself of supporting shear, bending and axial loads in various directions. Most truss structures, are formed of a plurality of diagonal strut members which are joined together by means of rivets, welds, or a nut and bolt arrangement. Examples of such prior art truss structures may be found in Bunker, U.S. Pat. No. 2,123,931 and Troutner, U.S. Pat. No. 3,541,749. In each of these patents, a truss structure is disclosed which requires a substantial amount of labor to join the strut beams to one another to provide a truss which is capable of supporting forces acting thereagainst. Another example of such a truss structure is disclosed in Snyder et al, U.S. Pat. No. 3,415,027 wherein an unsymmetrical truss structure is formed of a plurality of steel beams which must be joined to one another by means of a riveting process which requires a substantial amount of labor.

Kastan disclosed in U.S. Pat. No. 2,791,386 a symmetrical truss structure having a plurality of strut elements joined at bosses at the top and bottom of the truss. The truss structure is capable of transmitting shear, bending and axial loads in any direction and is used for the cores of aircraft wings, structural panels and box type structural beams. There is no disclosure of a method of forming this truss structure as an integral unit, such as, by means of an injection molding process.

Other forms of reinforcing structures are illustrated in Pajak, U.S. Pat. No. 2,609,068 and Plumley et al, U.S. Pat. No. 2,849,758 wherein a honeycomb structure is disclosed. The drawbacks to a honeycomb structure are that substantial manual labor is required to join the honeycomb elements together and once formed it is difficult to provide an insulating means for the structure if such is desired, i.e. insulation or foam cannot be injected through the honeycomb structure to provide an insulation medium.

Each of the aforementioned types of truss structures have the drawback that each require a relatively large amount of manual labor for forming the truss structure which inherently drives up the cost of such structures. THerefore, there is a need in the art for a simplified truss structure which can be formed with a minimum of labor to thereby reduce the cost of such structures. Patents which show types of mold structures include Schavoir, U.S. Pat. No. 1,409,591, Yellin, U.S. Pat. No. 2,566,817, Cohan, U.S. Pat. No. 3,333,300, Karlyn, U.S. Pat. No. 3,790,371, Taketa, U.S. Pat. No. 3,871,611 and Lipscomb, Canadian Patent No. 883,932.

It is another object of this invention to provide an apparatus for forming an integrated truss structure.

SHORT STATEMENT OF THE INVENTION

Accordingly, this invention relates to molds for forming integrated truss structures wherein such molds are comprised of two mold portions each including a plurality of male and female mold members. The male mold members each have a plurality of open grooves which may be orthogonally disposed with respect to one another or in the alternative may be disposed at 60° angles with respect to each other when viewed in a direction normal to the plane of the skin supported by the truss. The range of angles can be from about 30° to about 75° with a preferred angle being about 45°. The grooves slope away from the top surface of the mold member. Each of the female mold members have a generally recessed cavity with a plurality of open grooves aligned to mate with the grooves in the male mold members. These grooves slope away from the plane of the recessed cavity. The male and female members are positioned opposite one another with the grooves in the male and female members being aligned to define strut beam chambers and with the top of the male member being aligned with the recessed cavity of the female member to define a junction chamber. The male members are each positioned adjacent a female member, and vice versa, to thereby define alternate symmetrical upper and lower junction chambers interconnected by the strut beam chambers. When the mold portions are placed together the chambers defined thereby are all interconnected and a means is provided for injecting a moldable material throughout the chambers to thereby form an integrated, integral, truss panel.

In an alternate embodiment, integrated male and female mold members are formed. In this embodiment, a first fixed mold member includes a plurality of spaced, raised flat portions together with a plurality of spaced, recessed flat portions and a plurality of open grooves connecting the raised and recessed portions. A second movable mold member includes a plurality of spaced, raised flat portions and a plurality of spaced recessed flat portions with a plurality of open grooves connecting the raised and recessed portions. The mold members are positioned in opposing relationship with respect to one another wherein the raised portions of the first member are aligned with the recessed portions of the second member and vice versa. The alignment of the raised and recessed portions define a junction chamber and the alignment of the open grooves define the strut beam chambers. An injection menas is provided for injecting a moldable material into the thus formed chambers.

The present application also relates to various forms of such integrally molded truss panels. In one preferred exemplary form the junctions of each of the plurality of strut beams comprises a disc or junction plate. Since there are a plurality of such junction plates or contact points appearing on the outer, substantially planar, top and bottom surfaces of each of the truss cores used to form panels formed according to the present invention, such points together form the top and bottom outer sides of such cores. Accordingly, the presence of such junction plates provides a relatively large surface area which can be used when welding or adhesively or mechanically securing outer sheets or other outer structures at desired locations on the truss panel.

In alternative embodiments, the strut beams can ter,omate at the top and bottom surfaces of the truss panel or, on the sides of hollow, annular bosses. Still another embodiment concerns providing a hole within the center of the junction plate. The structures that include such holes or hollow, annular bosses then can permit the securing of exterior structres by gluing as well as by nails, screws, rivets or other mechanical means. Another arrangement includes the use of support saddles or channels into which the strut beams extend and in which they are secured. Thus, the saddle or channel would be designed with a particular cross-sectional profile suitable to receive a particularly shaped member therein.

The present invention also includes a variety of approaches to strengthen truss panels including the securing of outer sheet members or the incorporation of open grid type structures.

BRIEF DESCRIPTION OF THE DRAWINGS

Other objects, features and advantages of the present invention will become more fully apparent from the following detailed description of the preferred exemplary embodiments, the appended claims, and the accompanying drawings in which:

FIG. 16 is a diagrammatic view of a portion of another truss structure embodiment capable of being formed by the method and apparatus of the present invention;

FIG. 17 is a cross-section view illustrating opposed male and female mold members used to form the truss structure of FIG. 16;

FIG. 24 is a modification of the truss structure of FIG. 21 in which the double beams extend diagonally;

FIG. 25 is a diagrammatic top plan view of one contact point of a truss structure made according to the present invention showing a portion of a lattice of rods forming one of the outer surfaces of a panel secured thereto;

FIG. 26 is a diagrammatic side elevational view of a grooved contact point of a truss structure made according to the present invention;

DETAILED DESCRIPTION OF THE PREFERRED EXEMPLARY EMBODIMENTS

Figure 1:
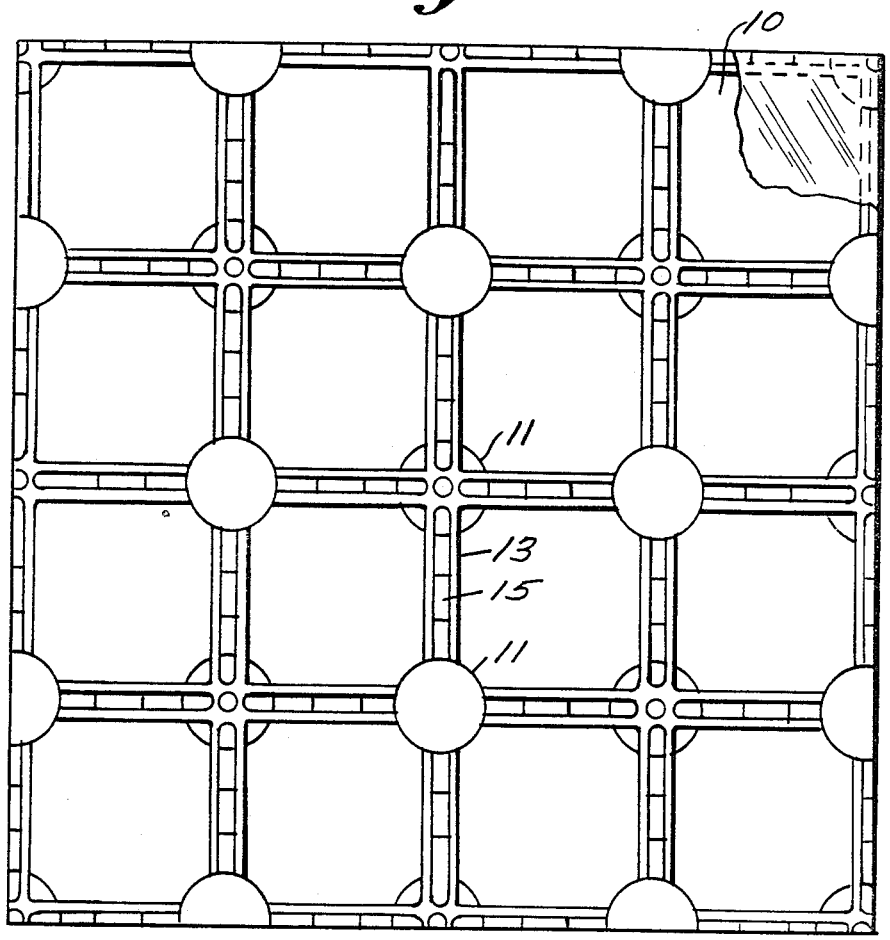
FIG. 1 is a plan view of one exemplary integrated truss structure formed by the method and apparatus of the present invention.
Figure 10:
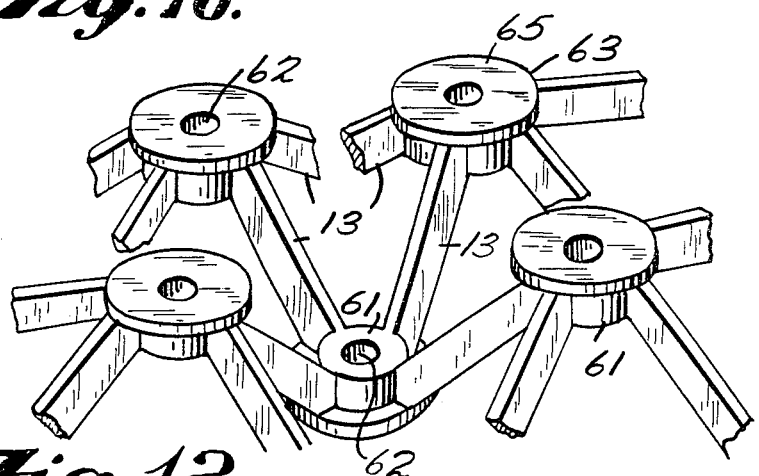
FIG. 10 is a partial perspective view of an alternate embodiment of a truss structure formed by an alternate molding apparatus of the present invention.

The present invention will now be described in connection with the exemplary preferred embodiments. Before describing the apparatus for forming a truss structure, reference is first made to FIGS. 1–3 where an exemplary embodiment of a truss structure, formed by the method and apparatus of the present invention is illustrated. The truss structure includes a plurality of symmetrically disposed junction plates 11 which are alternately positioned on the top and bottom of the truss. Each of the junction plates 11 are joined to an adjacent junction plate positioned on the opposite side of the truss panel structure by means of a plurality of strut beams 13. The strut beams 13 may be formed of a single element or, as illustrated in FIG. 1, a pair of elements 13 can be joined together by means of an internal web 15. Strut beams 13 extend outwardly away from junction plates 11 and are joined at adjacent junction plates on the underside thereof as illustrated. As illustrated, the strut beams are orthogonally disposed with respect to one another. However, it should be understood that three beams could extend outwardly from the junction plates at equal angles with respect to one another if desired. Other beam configurations are possible in keeping with the concept of the present invention. Each junction plate 11 is formed with a substantially flat exterior surface so that an outer skin or skins 10, such as a metallic or plastic plate wood sheet or other natural or synthetic board can be attached thereto by suitable means, such as, for example, glue, electromagnetic bonding, rivets or screws. If rivets or screws are to be used to secure the skin to the truss structure, holes 62 are formed in the junction plates 11 as illustrated in FIG. 10. It should also be noted that the outer surface of junction plates 11 together cooperate to form the outer, substantially, planar, top and bottom surfaces of the truss panel. Further, while only a small truss structure is shown in FIG. 1, it should be understood that it is representative of such truss panels includes a repeating design unit indicated within the square formed from phantom lines. By having this design unit repeated, truss structures of various sizes and dimensioned can be molded as integral structures.

The material used for forming truss structures according to the present invention may be any plastic material including, thermoplastics, such as polyolefins, polycarbonate or nylon, etc., and thermosetting materials or reinforced plastic materials, polyethylene or polycarbonate. In fact, the structure could be formed of any plastic or metallic materials, such as aluminum, for which mold material is available to withstand the temperature, pressure and other requirements for molding same.

Figure 4:
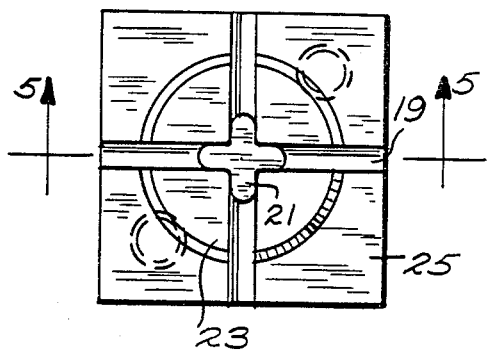
FIG. 4 is a plan view of a male mold member for forming a truss structure.
Figure 5:
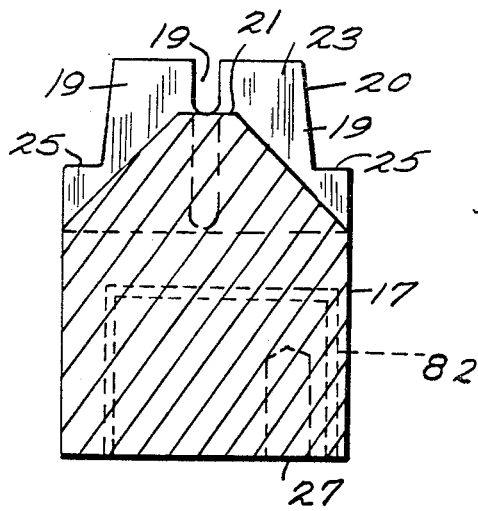
FIG. 5 is a section view taken along the lines 5—5 of FIG. 4 of the male mold member.

FIGS. 4 and 5 illustrate one of a plurality of male mold sections used in the mold when forming an integrated truss structure. As illustrated in FIG. 4, the mold includes a metal molding block formed, for example, from beryllium copper castings. The beryllium copper castings are subjected to several thousand pounds per square inch pressure while solidifying the mold. Beryllium copper is advantageous because of its good heat conducting properties which result in a fairly rapid and uniform cooling of the mold after the hot plastic or metallic material which is to form the truss structure is injected into the mold. The male mold member 17 has four orthogonally disposed grooves 19 formed therein which slope downwardly and away from a plateau 21. In the preferred embodiment, the grooves slope away from the plane of the plateau 21 at a strut angle of approximately 45°, although it should be appreciated that the strut angle can be varied depending upon the structural requirements of the panel or skin which the truss supports. It further should be understood that this angle can be different in one direction than in an orthogonal direction. Thus, with reference to FIG. 1 the junction plates 11 in one direction would be closer together than in a direction at a right angle thereto.

The male member 17 has an upper surface 23 which as will be seen mates or engages the recess cavity in the female mold member to define a junction chamber for forming the junction plates 11. The male member also includes a mold bearing surface 25 which bears against the corresponding surface on the female mold members to define the molding position of the male and female mold members. Referring to FIG. 5, which is a cross-sectional view of the male mold member taken along the lines 5—5 thereof, the grooves 19 are shown sloping downwardly away from the plateau 21 at about a 45° angle. The top surface 23 extends upwardly from the plateau 21 and forms the mold surface for the underside of the junction plates 11. The male mold member is fixedly secured to a support plate (not shown) by means of, for example, one or more screws which are inserted into the hole 27 formed in the base of the male mold member or by any other known techniques which will securely hold the mold member in place. A suitable alignment means such as a dowel can be utilized to insure that each mold member is positioned on the support plate directly opposite its mating member. It should be appreciated that cooling channels could be formed in the mold member for the purpose of carrying the heat of the molten plastic or metal away from the mold block to thereby facilitate the cooling of the molded material.

Figure 6:
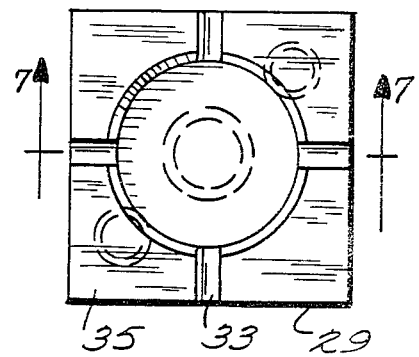
FIG. 6 is a plan view of a female mold member for forming a truss structure.
Figure 7:
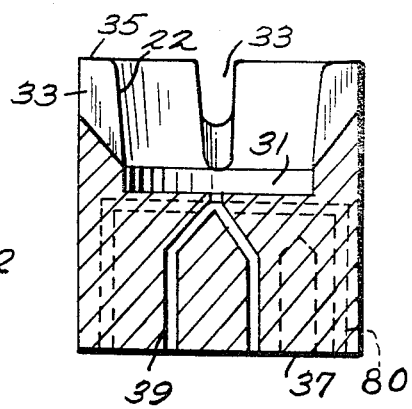
FIG. 7 is a section view taken along the lines 7—7 of FIG. 6.

Refer now to FIGS. 6 and 7 where there is illustrated a female mold block. The female mold block 29 includes a recessed cavity 31 having a plurality of grooves 33 extending upwardly, and away therefrom at about a 45° angle with respect to the plane of the bottom surface of the recessed cavity. The mold block as illustrated in FIG. 7 has an upper bearing surface 35 which bears against the surface 25 of the male mold member 17 when the two blocks are positioned one opposite the other in preparation for injecting a mold material there. The female mold block 29 is secured to a base support plate (not shown) by means of one or more screws which are inserted into the threaded holes 37 or securement can be achieved by other techniques known in the art. As aforementioned, the female members can be aligned by a suitable means, such as dowels, to insure the proper alignment with the mating male member. The male and female mold blocks when positioned opposite one another in a mating relationship define a junction chamber and plurality of strut beam chambers.

In order to facilitate separation of the male and female mold members, the cone angle, i.e., the angle at which the sides 20 and 22 of the male and female members, respectively, slope with respect to the axis of the mold travel, is made a suitable size which may vary depending upon the temperature and mold materials utilized. However, this angle preferably should not be so great that the side wall 22 of the female member intersects the side wall of the mold below the mating established by the mold bearing surfaces 25. It should also be appreciated that the grooves must have a draft, i.e., slightly inclined walls, so that the molded truss structure can be easily removed from the mold members.

A molding material such as a plastic or metallic material is injected into the female mold via channel 39 and then into the recessed cavity 31 when the female mold member and the male mold member are positioned opposite one another.

Figure 8:
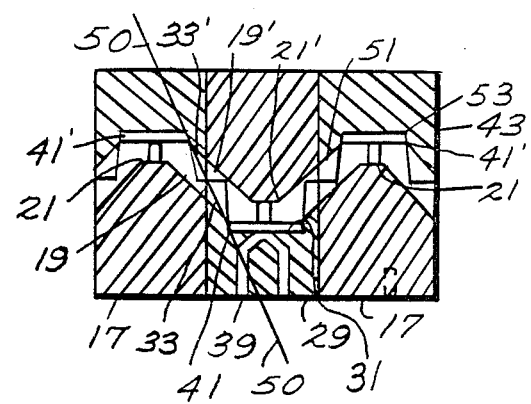
FIG. 8 is a simplified section view of three sections of the mold for forming the truss structure.
Figure 9:
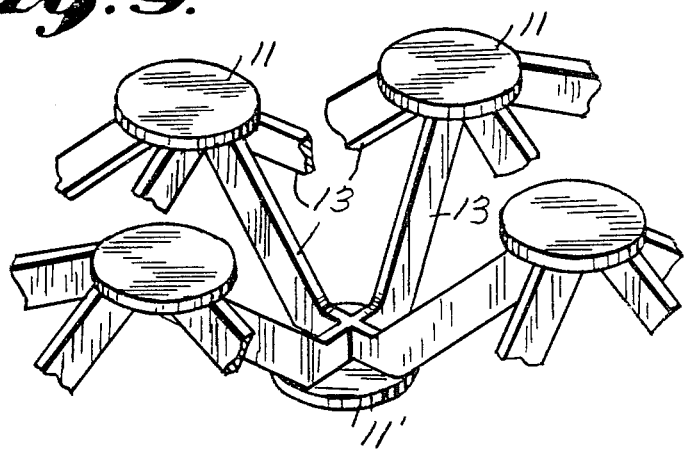
FIG. 9 is a partial perspective view of this truss structure formed by the method and apparatus of the present invention.

Referring now to FIG. 8 where there is an ilustration of how the respective male and female members are aligned to obtain the truss structure illustrated in partial perspective in FIG. 9. As illustrated in FIG. 8, male and female mold members are positioned alternately with respect to one another so that a female mold member is positioned adjacent each male mold member and vice versa. Thus, female mold member 29 has positioned against each of its sides a male mold member 17 to thereby form a first lower mold member 43a having a plurality of raised plateaus 21, and a plurality of spaced recessed flat portions 31 each connected by means of open grooves 19 and 33. A second plurality of male and female members are joined together to form a second upper mold member 43b that is vertically movable with respect to the first mold member 43a. This mold member also has male and female members alternately positioned against one another as illustrated to define a plurality of raised cavities 41', and a plurality of plateaus 21', each joined together by means of open grooves 19' and 33'. In the preferred embodiment, the bottom mold is formed by joining a plurality of mold members by fixedly securing these members to a base plate (not shown). The upper mold 43b is also joined to a support plate (not shown), but is movable with respect to the lower mold so that once the mold material is injected into the mold, the upper mold can be moved away from the lower mold to thereby free the truss structure for removal of the mold. When the upper mold 43b is moved into position with respect to the lower mold 43a, the bearing surfaces 25 and 35 serve to define the final position of the upper mold with respect to the lower mold. When this occurs, a plurality of strut beam chambers 51 are formed from the open grooves 17, 17', 19 and 19'. In addition, a plurality of junction plate chambers 53 are formed by means of the recessed cavities 31, and the upper surface 23 of the male mold members. The moldable material, plastic or metallic materials, is injected into the strut beam chambers and the junction plate chambers thus formed through annular channel 39. The channel 39 is preferably formed in one or more of the female mold members which are secured to the bottom support plate. If desired, a heating element can be positioned in one or more of the female mold members which are utilized for injecting plastic or other mold materials for the purpose of maintaining the temperature of the molten mold material at a substantially uniform high temperature.

Figures 2, 3:
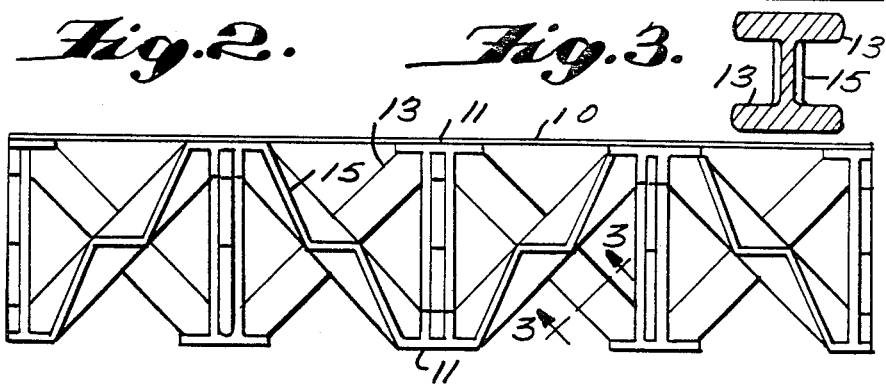
FIG. 2 is a side elevation view of the truss structure of FIGURE 1.
FIG. 3 is a section view taken along the lines 3—3 of FIG. 2 of a strut beam of the truss structure formed by the method and apparatus of the present invention.

After the molten mold material has been injected into the chambers defined by the upper and lower molds, the upper mold is removed away from the lower mold with the truss structure illustrated in partial perspective view in FIG. 9 resulting therefrom. In FIG. 9, a plurality of junction plates 11 are formed, each spaced symmetrically with respect to one another and with respect to the junction plates 11' on the opposite side of the truss structure. Each of the junction plates are joined to one another by means of strut beams 13 which are integrally molded with junction plates 11 and 11'. As illustrated in FIG. 9, each strut beam is a single beam, however, it should be understood that, in keeping with the present invention, by a simple modification of the mold structure a double or I-beam structure could be provided such as illustrated in FIGS. 1–3.

If desired, rather than forming the upper and lower mold halves from a plurality of separate male and female mold members, a single mold member could be formed. This would require appropriate machining in order to insure that plateaus 21, recess cavities 41, and the open grooves were all in alignment with respect to one another when the mold is closed.

In such an integrated mold structure the cone angle should not be greater than the angle formed by line 50 shown in FIG. 8 extending from the edge of one recessed cavity 41 to the edge of an adjacent oppositely disposed cavity 41. This will enable the male and female cones not to be truncated on their sides.

Alternatively, mold modules could be formed from a group of individual molds with each mold group, perhaps, having a different but compatible design. A plurality of such molds could be assembled together and would thus make up a complete mold structure. This has the benefit of avoiding cumulative dimensional error which could result from making a large integral mold.

In the present case, individual male and female mold members were joined to one another on a base plate to form the upper and lower mold members because of the simplicity of the structure thereof and because of the flexibility of size of the truss structure which can result by adding or subtracting male and female members from the upper and lower mold members.

Figure 11:
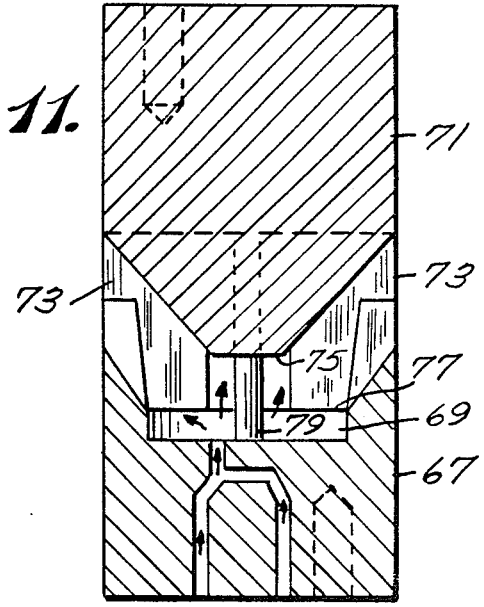
FIG. 11 is a section view illustrating the opposed male and female members for forming the truss structure of FIG. 10.

Referring now to FIGS. 10 and 11 where there is illustrated an alternate embodiment of the apparatus of the present invention for forming a truss structure having hollow annular bosses 61 which permit the use of rivets, screws or inserts to fasten a skin material to the truss structure. The annular bosses may also be provided in a panel where the junction plates are adhered or welded to the skins. In this case the bosses provide strong points for attaching other structures to the panel by fasteners such as screws or blind rivets. Thus, as illustrated in FIG. 10, the truss structure is formed of a circular junction plate 63 having a flat upper surface or skin attachment surface 65 with the junction plate having a hole 62 through the center thereof. On the underside of the junction plate 63 is formed an annular, hollow boss 61, which serves as a reinforcement for the junction of the strut beams 13 and the junction plate 63. Such a truss structure may be formed from a mold comprising a plurality of male and female mold members of the type illustrated in FIG. 11. Thus, as is illustrated in FIG. 11, a female mold member 67, is of the same design as the female mold member of FIGS. 6 and 7 with one important exception. The exception relates to the manner in which the molten moldable material is injected into the chambers defined by the juxtaposition of the male and female mold members. Thus, since a hole 62 is to be formed through the junction plate 63, no molten material can be injected into this region of the truss structure. Thus, the point at which the mold material is injected into the mold must be off-center from the center of the recessed cavity 69 as illustrated in the figure.

The male mold member 71 includes a plurality of open grooves 73 together with a plateau surface 75, and an upper surface 77. However, a center post 79 must be formed either in the male mold member 71 or the female mold member 67 or in both in order to define a circular area about which the moldable material flows but by which no moldable material can flow into a cylindrical air volume defined by the post 79. This volume results in the formation of the hole 62 in the junction plate 63. As aforementioned, in connection with the description of the composite mold structure of FIG. 8, a plurality of mold members are joined to one another with the female and male mold members being juxtaposed alternately to thereby define upper and lower mold members. In the alternative, rather than providing a plurality of male and female mold members which are fastened onto a back plate next to one another, an integral upper and lower mold member may be machined to have the same configuration as the plurality of juxtaposed male and female mold members.

Figure 12:
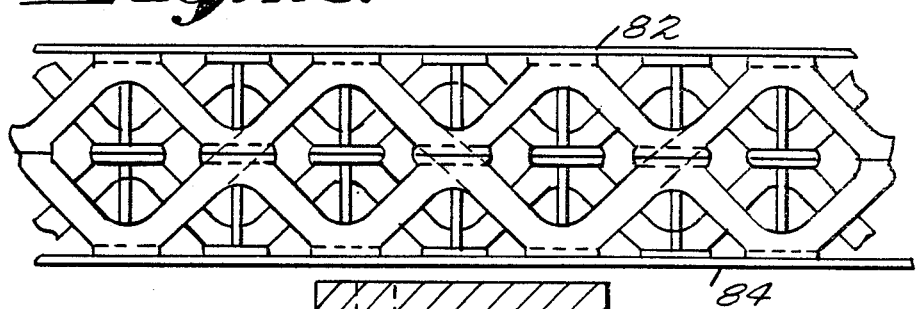
FIG. 12 is an alternate truss structure having an interlaced strut beam structure capable of being formed by the method and apparatus of the present invention.

Refer now to FIG. 12 where there is illustrated a high strength truss structure having an interleaved truss core structure. The molded truss structure of FIG. 12 is formed by simply joining together two truss structures of the type illustrated in FIG. 9. Such truss structures can be joined together by any suitable means known in the art such as for example, by the use of adhesive compounds. As a result of joining the two truss structures, it can be seen that twice as many strut beams can be provided for a given thickness of the truss structure as would be possible if the two truss structures were not joined together. Thus, with reference to FIG. 12, shown in dotted lines is the strut beam structure which would result from a truss beam formed from a single mold. It can readily be seen that by fixing one truss structure with respect to another that twice as many junction plates 11 per unit length are provided parallel to the skin or surface supported by the truss and twice as many strut beams 13 are formed as would ordinarily be formed by a single molding step utilizing the same strut angle. The buckling resistance of the skins 82 and 84 will be increased because of the increased closeness of the junction plates 11 or in the alternative thinner skins can be used.

The lamination or joining of truss structures can be increased in number beyond two as required for strength, stiffness, or other requirements. Intermediate skins may be attached between the layers in addition to the outer skins for various purposes such as improved thermal insulation in translucent panels or reduced radiant heat transmission if reflective surfaces are employed.

Figure 13:
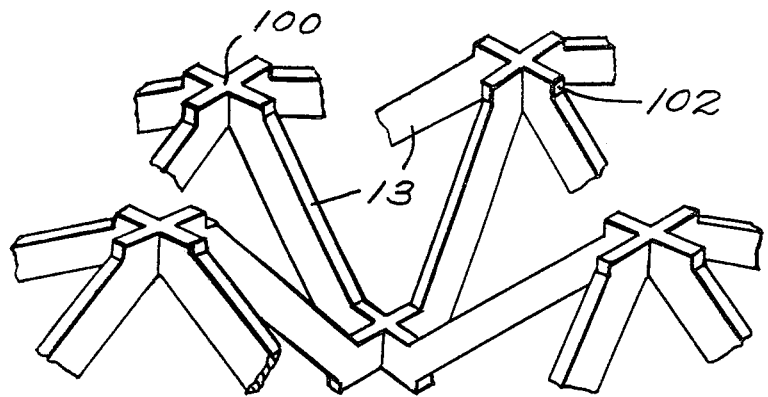
FIG. 13 is a diagrammatic view of a portion of another truss structure embodiment capable of being formed by the method and apparatus of the present invention.

Turning now to FIG. 13 another exemplary embodiment of the truss structure according to the present invention is shown. This structure differs from the truss shown in FIG. 9 in that junction plates 11 have been removed so that strut beams 13 now join together directly to form a cross-shaped junction element having an upper or exposed surface 100. While the upper edge of strut beams 13 can directly join or intersect surface 100 a step indicated at 102 is provided between surface 100 and the inserting point of the upper surface of strut beams 13. Thus, as was the case in FIG. 9 with respect to junction plates 11 which appeared in one planar surface of the truss structure and junction plates 11' that appeared in the opposing planar face of the truss structure so two alternating faces 100 will appear in both the upper and lower surfaces of the truss core structure and cooperate together to form substantially upper and lower planar faces of the truss structure. I have found that in some instances the bonding surface provided by junction plates 11 and 11' is not necessary and that smaller bonding surfaces such as are formed in FIG. 13 at 100 is all that is required for joining the truss structure to various types of surface members including outer skins or structural webs. Further, this modified truss structure as shown in FIG. 13 can be used advantageously as a dividing screen or can be used with other like truss elements of a predetermined size to form a protective panel as, for example, a machinery guard. The truss structure produced as shown in FIG. 13 could be bonded by suitable adhesives to transparent sheets to produce a self-supporting guard which allows observation of the machine. Vision could be further enhanced if the material from which the truss core were made were a clear plastic such as clear polycarbonate.

Figure 14:
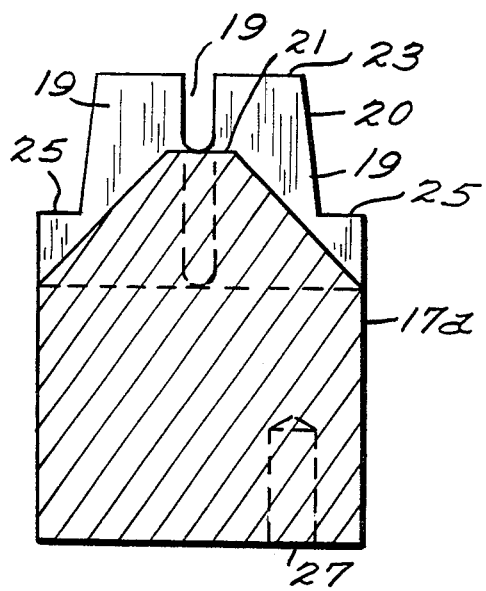
FIG. 14 is a cross-section view of a modified form of a male mold member for forming the truss structure of FIG. 13.
Figure 15:
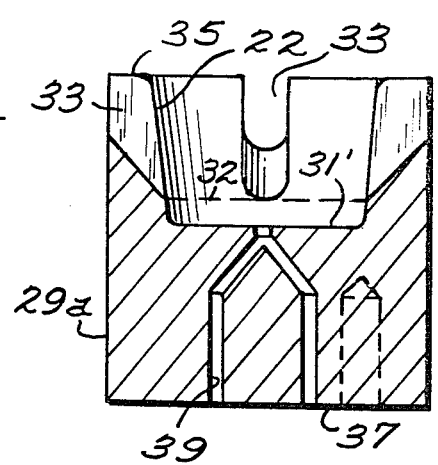
FIG. 15 is a cross-section view of a modified female mold member for forming the truss structure of FIG. 13.

The modified truss structure shown in FIG. 13 is produced by the use of opposed male and female members 17a and 29a respectively shown in FIGS. 14 and 15. These members differ from mold members 17 and 29 shown in FIGS. 5 and 7 in that the upper surface 23 has been extended away from plateau 21 a distance corresponding to the height of step 102 and this added section is shown generally by the bracket indicated at 104. Recessed cavity 31' of female mold member 29a differs from cavity 31 shown in FIG. 7 in that it has been modified in order to receive the added section 104. In order to produce the stepped structure shown in FIG. 13 with step 102 grooves 33 would terminate prior to the bottom of cavity 31'. If, however, the top surface of strut beams 13 extended to surface 100 then grooves 33 would extend all the way to the bottom of cavity 31'. Alternatively the bottom of that cavity could be raised so that it directly intersected the termination point of grooves 33 as shown by the dotted line 32 in FIG. 15.

Turning now to FIGS. 16–19 FIGS. 16 and 18 show two alternative forms of the structure set forth in FIG. 10 which sets forth a truss structure according to the present invention. This truss core structure is provided with a modified type of hollow angular boss 61' that forms an integral structure with the ends of strut beams 13. In FIG. 10 the angular bosses 61 were provided with junction plates 11 which had an opening or hole 62 that extended not only through boss 61 but also through plate 11. The junction plate 11 has been removed from both embodiments shown in FIGS. 16 and 18 as there may be many instances where that plate and the bonding surface provided thereby are not needed. In FIG. 16 the tops of strut beams 13 extend upwardly to a height equal to the exposed exterior surface of boss 61' so that on both sides of the truss structure the substantially planar sides of that structure are ormed by those upper surfaces of the struts as well as the surface 108 of annular boss 61'.

The mold members for producing the structure set forth in FIG. 16 is shown in FIG. 17 and are each comprised of a plurality of male and female mold members as shown at 71 and 67, respectively. These members can be compared with FIG. 11 and it can be seen that the recessed cavity 69 as shown in FIG. 7 has been removed from the mold structure shown in FIG. 17 since it is the cavity 69 in which junction plate 11 is formed about center post 79. Likewise, the length of center post 79' has now been reduced from the length needed in FIG. 7 but the post 79' still meets or engages the bottom surface of the cavity within female mold structure 67 so that hole 62 is formed in a manner that allows it to extend completely through angular boss 61'.

It should be understood that the annular boss 61' could be formed without hole 62 simply by omitting post 79' from the mold.

By forming the strut beams 13 with respect to angular bosses 61' in this manner I have found that it is possible to have the axis of each of the strut beams 13 arranged in a way such that they can intersect the plane of the neutral axis of the surface members attached to the truss core structure, including lattice structures or sheeting materials applied to the exterior of the truss structure. For example, if relatively large trusses having dimensions four feet by eight feet or eight feet by sixteen feet are formed in the manner as shown in FIG. 16, it is possible to apply exterior sheeting materials such as insulation panels, plywood sheets, gypsum board or other common building materials to the exterior of this truss structure either by gluing those materials to exposed surfaces 108 or by employing screws or nails that would fit within holes 62 or if the exterior sheet material were metal, that material could be attached to the truss structure by means of welding to surface 108 or angular bosses 61' or by riveting through hole 62. It should also be pointed out that while strut beams 13 have been shown as having a substantially rectangular cross-sectional shape such strut beams could be provided with a round, square or relatively flat cross-sectional shape as well depending upon the materials used to make the truss structure and the purpose for which the truss structure is going to be used.

Figures 18, 19:
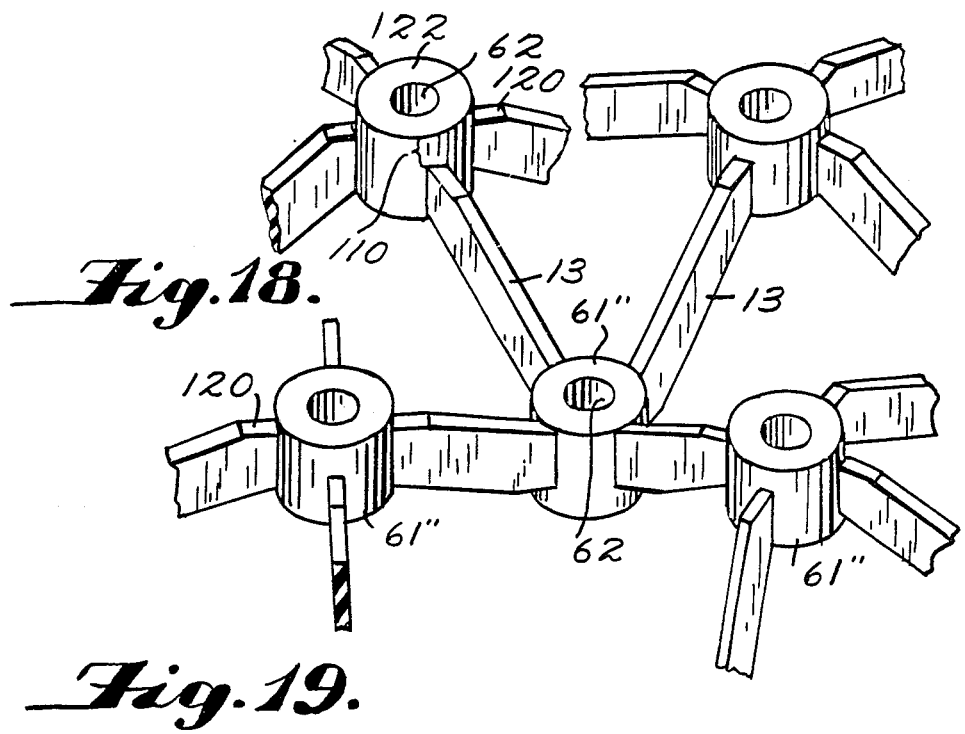
FIG. 18 is diagrammatic view of a portion of still another truss structure embodiment capable of being formed by the method and apparatus of the present invention.
FIG. 19 is a cross-sectional view illustrating opposed male and female mold members used to form the truss structure of FIG. 18.

In FIG. 18 the strut beams 13 intersect angular bosses 61" so that the angular boss 61" extends up from the point where the top surface of strut beams 13 intersect the outer side wall of the boss 61". Thus, a portion of the hollow boss extends above strut beams 13 as indicated by bracket 110.

The mold elements used to construct the truss structure shown in FIG. 18 are set forth in FIG. 19 and again differ from the members shown in FIG. 11 in that the portion of cavity 69 surrounding the area in which angular boss 61 is formed is now filled by raising the bottom surface of the inner cavity of female mold member 67a. Specifically, with reference to FIG. 19 the centrally located post 79" is still provided between plateau 75 of the male mold member 71 and the bottom surface of the recessed cavity within female mold member 67a. The recessed area within female mold member 67a is now made up of two surface levels an upper one indicated at 112 and a lower one at 114. Between these two levels is an annular vertical surface indicated at 116 which meshes with an annular surface 118 provided in the male mold member 71a so that it extends vertically away from the boundary established by plateau surface 75. When the male and female mold members are together, as shown in FIG. 19, vertical annular surfaces 116 and 118 meet and form, together with post 79", an annular chamber which forms the annular hollow boss 61". Surfaces 112 and 114 serve to define the upper surfaces 120 and 122 respectively of the strut beams 13 and annular boss 61". As was the case with the mold members shown in FIG. 11 the injection point for the molding material must be offset from the center of the cavity existing between the two mold members and accordingly the injection groove 124 shown as being offset from post 79".

Here again, by moving the axes of strut beams 13 it is possible here to also design different sized hollow annular bosses 61" so that the intersection of those axes can be moved toward and away from the substantially planar surface established by the plurality of surfaces 122 on both top and bottom sides of the truss structure. I find it to be advantageous to have the neutral axis of any sheets secured to the truss structures be intersected by the axis of the strut beams as this reduces the generation of any additional bending moments following the completion of a panel structure comprised of two parallel sheets secured to the opposite sides of the truss structure made according to the present invention. Such a structure is set forth in FIG. 12. In that figure two truss structures have been incorporated within the panel structure but such panel structures could include only one truss structure or could include more than the two. Likewise, as was previously indicated the dotted line representation in FIG. 12 sets forth what the panel structure would look like if only a single truss structure were incorporated between the two sheets 82 and 84. Thus, for given thicknesses of sheet structures that are to be placed on the exterior of the truss members truss structures can be molded with the axes of the strut beams designed so that they will intersect at the neutral plane of the particular thickness of the surface member.

Figure 20:
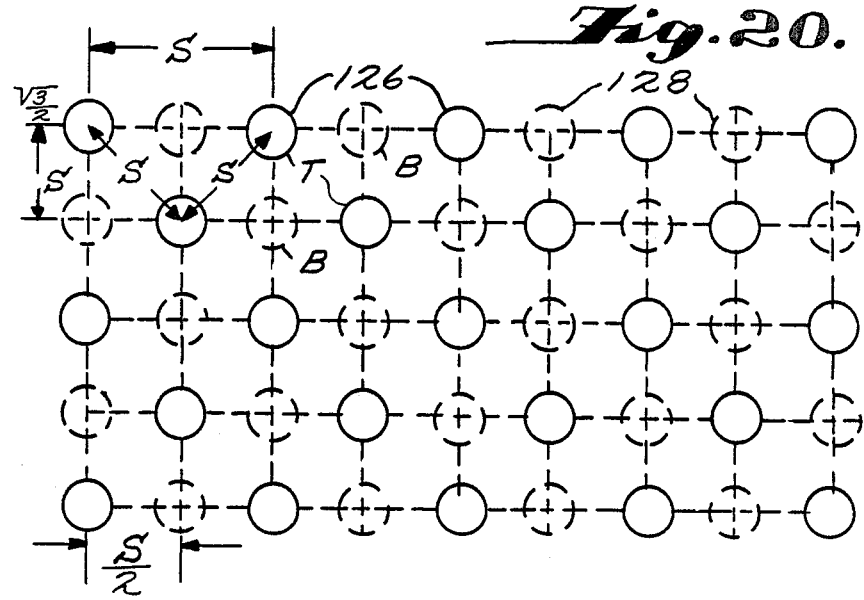
FIG. 20 a diagrammatic view of a portion of another truss structure embodiment capable of being formed by the method and apparatus of the present invention in which the support points extending in one direction have been moved closer together.

Turning now to FIG. 20 another alternative exemplary embodiment of a truss structure according to the present invention is set forth. I found that in some instances it would be desirable to have the contact surfaces or points formed where the strut beams 13 intersect in each side plane of the truss structure lie closer together in one direction than the other. For example, when manufacturing curved panel structures where a truss structure made according to the present invention is subsequently put into a press to develop a predetermined amount of curvature in the truss structure following which the truss structure was then incorporated between two similarly curved outer plates, it would be advantageous to at times concentrate the number of contact points in certain areas. Such panel structures could be used when making a wide variety of curved structures including the side wall members for automobiles or airplanes, boat hulls, etcetera. At the point where the greatest curvature exists it would be desirable to have contact points lying closer together and I have found that this could be accomplished by spacing the contact points 126, which appear on and define one of the planar surfaces of the truss structure shown in FIG. 20, at equal distances spaced from one another at the corners of an equilateral triangle. The contact points 128 appearing on and defining the opposite or bottom planar surface of the truss structure shown in FIG. 20 would then be offset half the distance between points 126. Thus, if the distance between points 126 along a horizontal row equal to 5, the distance between vertical rows would be 0.5S. The distance between horizontal rows, or the height of the equilateral triangle, would be equal to the square root of 0.866S. Thus, the horizontal rows would be spaced the square root of 3 times further apart than the vertical rows. Thus, by making similar kinds of changes with respect to the spacing between points 126 and 128 the contact points appearing in both surfaces could be modified to suit the particular needs of the structural panel being produced.

Figure 21:
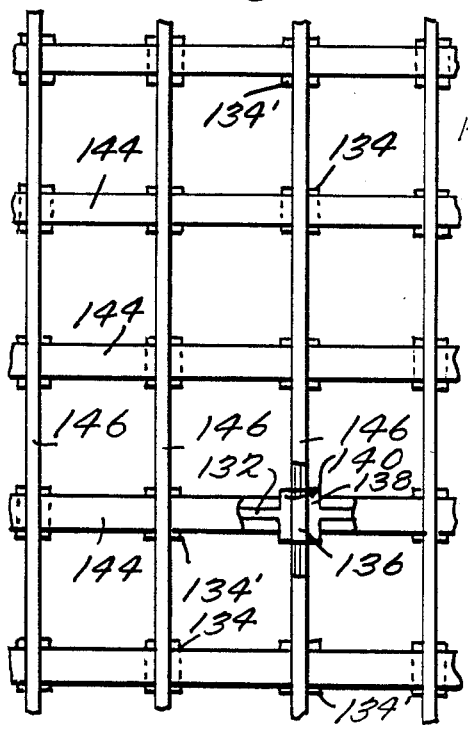
FIG. 21 is a diagrammatic top plan view of a portion of a truss formed according to the present invention having a wooden beam structure provided on its top and bottom surfaces.
Figure 22:
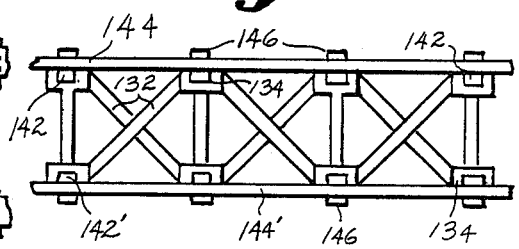
FIG. 22 is an end view of the truss structure embodiment of FIG. 21.
Figure 23:
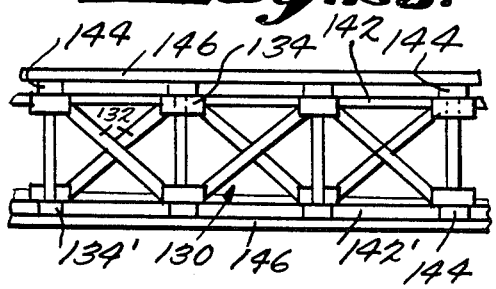
FIG. 23 is a side elevational view of the truss structure embodiment of FIG. 21.

Turning now to FIGS. 21-24 another alternative embodiment of a structural panel incorporating the truss structures made according to the present invention is set forth. The truss structure is indicated in FIGS. 22 and 23 generally at 130 is comprised of struts 132 which tie together and are integrally molded with rectangular shaped pad elements. For ease of explanation the rectangular pads appearing in the top and bottom surfaces respectively of the truss structure 130 are indicated by numerals 134 and 134', respectively. As indicated in FIG. 1, each of the pads 134 and 134' have an open channel or saddle 136 formed between two upwardly extending side pieces 138 and 140. This channel, 136 can receive a panel surface member such as, for example, a lattice structure which begins with a wood strip 142 which can be glued or in any other convenient manner secured within channel 136. As shown in FIG. 21 channels 136 extend in what would appear to be the vertical direction and accordingly in this embodiment wood strips 142 would extend on one side of the structure from one pad 134 to the next pad 134 and so on along the length of that side.

As shown in FIGS. 22 and 23 the next layer of the lattice structures formed from a plurality of second wooden strips 144 positioned orthogonally with respect to strips 142.

I have found that for a panel having dimensions approximately by eight (8) feet by sixteen (16) feet having the distance between the neutral axis of the lattices second to the truss core being about eight (8) inches, the panel being designed for forty (40) pounds per square foot using hardwoods, the dimensions for wood strips 142 can preferably be about 1 inch wide by ⅜ inches thick whereas the dimensions for wood strips 144 can be approximately 2 inches wide by approximately ⅜ inches thick. Wood strips 144 can be secured to the panel and specifically at the cross points with wood strips 142 by any convenient means such as by screws or glue and together serve to provide additional resistance to bending and shear forces to each side of the panel.

While the structure could incorporate only wood strips 142 and 144 I have found that it would be preferable to complete the lattice structure by including a third group of a plurality of additional wood strips 146 identical to wood strips 142, running in the same direction as wood strips 142 and overlying strips 142 and 144. Again, wood strips 146 can be secured to the structure by glue or any other convenient means such as by screws or bolts, and the finished structure produces a building panel to which a wide variety of additional surface sheet structures could be applied either by nails, staples, glue or other conventional means.

It should also be understood that both the top and bottom sides of the panel structure can be formed as just described with respect to the application of wood strips 142-146 and these are indicated in FIGS. 22 and 23 respectively by reference numerals 142', 144' and 146'.

It should also be understood that the resulting building panel as shown in FIGS. 21-23 could be filled with various types of thermal insulating materials. For example, the truss panel structure could be filled with a foam insulator or, alternatively, following the securing of a surface sheet to one side of the panel, such as a piece of gypsum board or plywood, the entire structure could thereafter be filled with a foam insulating material or blown insulation of various types. Thereafter, the second or top skin could be attached which would hold the insulation in place within the panel structure. Additionally, as discussed more fully hereinafter, the resulting panel structure could also be provided with end or side pieces so that the resulting building panel could be enclosed not only from the top and bottom by skin material secured to the cross members 142-146 but also by the side or end pieces that would close off the remaining exposed open portions of the panel.

Turning now to FIG. 24 the truss structure would remain the same except that the pads formed by the junction points for the struts would be changed in configuration so that wood strips 142 are placed diagonally. Wood strips 144 are applied there over as in FIG. 16 while wood strips 146 are also applied diagonally across the top of strips 144. The angle between diagonal members 142 and 146 can vary widely but the preferred range is about 30° to about 90°. The form of the pads appearing on this modified truss structure are shown at 148 in the upper surface and 150, with pads 148 appearing on the upper surface of the structure while pads 150 appear on the lower or bottom surface. Each pad is again provided with an open channel or saddle area 152 which is formed between two upwardly extending triangular portion 154 and 156.

Only the bottom wood strips 142 fit within pads 148 and 150 with wood strips 144 and 146 being bonded respectively to wood strip 142 and 144. The bonding between the wood strips can be effected by adhesives or by using mechanical fastening techniques.

It should be pointed out, that while discussing the embodiment set forth in FIGS. 21-24 while wood strips have been specifically referred to other structural members such as plastic strips, metal beams, or some type of laminated structure, or wires could likewise be used with the shape of the saddle or the pad area being changed to effectively support and secure the supporting member to the truss structure.

The diagonal embodiment set forth in FIG. 24 produces a truss panel structure which exhibits extremely good stress resistance with respect to both bending and shear forces and because of the presence of the diagonal members would be exceptionally well suited for use in building roof or wall structures.

When employing a grid of wires as the surface member in the truss panel, it would be possible to form the pads 162 appearing at the end of the struts 13 as shown in FIG. 26, with slots or grooves 158 and 160 within the upper surface. Grooves 158 and 160 are shown as being perpendicular to each other and crossing in the center of the pad although they could be varied to suit the surface member being used. With such a structure, it is possible to incorporate cross-wires 164 and 166 respectively within grooves 158 and 160. The pad could also include the junction plate 11 which in certain circumstances would provide a greater surface to which the wires or a subsequent outer skin could be secured and likewise such a junction plate might provide additional plastic material when securing wires 164 and 166 in place. I have found that it is preferable to have the wires welded together at their crossing points so that shear forces between a junction plate 11 and its wire pair can be transmitted by compression into the wire at right angles to the force and then transferred to the wire in the direction of the force by shear in the welded junction of the wires. It is also preferable to have the wires welded so that the thickness at their crossing points is the same as the thickness of the wires themselves so that the neutral axes of both wires can be in the same plane and at the intersectins of the neutral axes of the truss core struts. Thereafter, the thermoplastic material from which the truss element is formed could be melted so that it could be squeezed about the wires or alternatively, the wires could be secured within grooves 158 and 160 by adhesive applied over the wires or means of a separate securing disk, shown in phantom at 168 in FIG. 6 that could be bonded by adhesives or by an electromagnetic bonding technique to the upper surface of pad 162. In that case also, the exterior substantially planar surface of the truss structure would be defined by the upper surface of disk 168.

Figure 27:
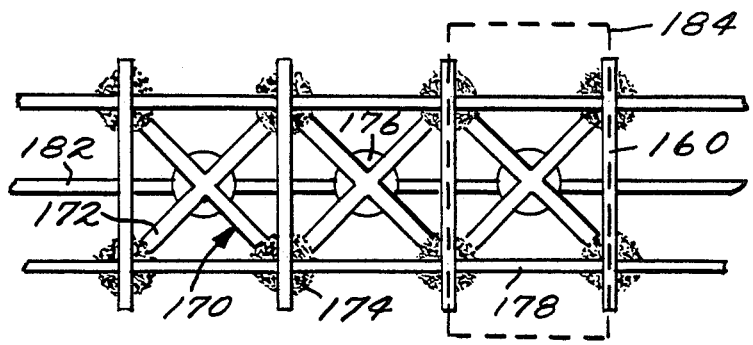
FIG. 27 is a diagrammatic top plan view of a portion of a truss structure according to the present invention incorporating the support system shown in FIG. 25.

In FIG. 27 still another alternative embodiment of a truss structure according to the present invention is set forth which can incorporate additional truss members in the planes defined by the pads on their exterior surfaces. Such members can, for example, appear on opposite sides of the truss structure or only on one side. The truss structure, generally indicated at 170, is comprised of a plurality of connecting struts or beams 172 which terminate at pads. Those appearing on the top surface are indicated at 174 and are arranged into two substantially parallel rows while those appearing on the bottom surface are indicated at 176 and lie in one row substantially parallel to the two rows of pads 174. A grid structure comprised of wires or rods 178 and 180 can be subsequently glued, by epoxy or other adhexives, to the top pads 174 with wires 178 extending between the rows of pads 174. While wires 180 extend along or parallel with the rows between adjacent pads 174. In this particular embodiment, a single row of pads 176 forms the bottom of the truss structure and a single wire 182 extends along the row between adjacent pads 176.

The truss structure 170 could be comprised of a diagonal segment cut from a truss made according to the FIG. 9 embodiment. Alternatively, the structure could be molded as a separate, integral element with any desired length. In that regard, a repeating structural unit is shown by the dotted box 184.

With the construction set forth in FIG. 27, wire 182 tie together the plurality of pads 176 appearing along the bottom surface so that they will resist bending moments generated within the structure. The grid formed from wires 178 and 180, which are preferably welded together prior to their being secured to the truss structure 170 ties together pads 174 horizontally so that pads 174 resist downwardly and outwardly applied bending moments. This truss structure which has been strengthened by used of wires 178-182 would provide a very unique support runner or skid device which could be secured by any convenient means such as by stapling or gluing it to the bottoms of containers, pallets or other devices where it would be desirable to have the container raised off of the floor as, for example, to allow the N of a forklift truck to pass beneath the structure. It should be understood, that other securing means besides wires 178-182 could also be employed, such as, for example, wood strips, plastic rods, or a mesh-type material it only being important to tie the pads appearing in the upper and lower surface together. It should also be understood that the strengthening structure used with the truss structure 170 could be secured to pads 174 and 176 in any of the ways previously discussed herein. Further, the wire structure as shown could also be merely placed on the truss structure with heat then being applied locally to the pads 174 and 176 melting the material appearing therein until it flowed about the wires at which point heating could be stopped to allow the material to solidify. For certain uses it might be desirable to omit cross-wires 180 so that the finished structure includes only the additional truss members 178 on the top and 182 on the bottom. By securing the structure to the base of containers, the effect of having members 180 present is achieved. Further, such structures would be stackable for shipping purposes.

Turning now to FIGS. 28-31 for additional truss panel strengthening embodiments are set forth with each one involving a structurally sound sheet or skin member which can be applied to one or both sides of truss structres made according to the present invention.

Figure 28:
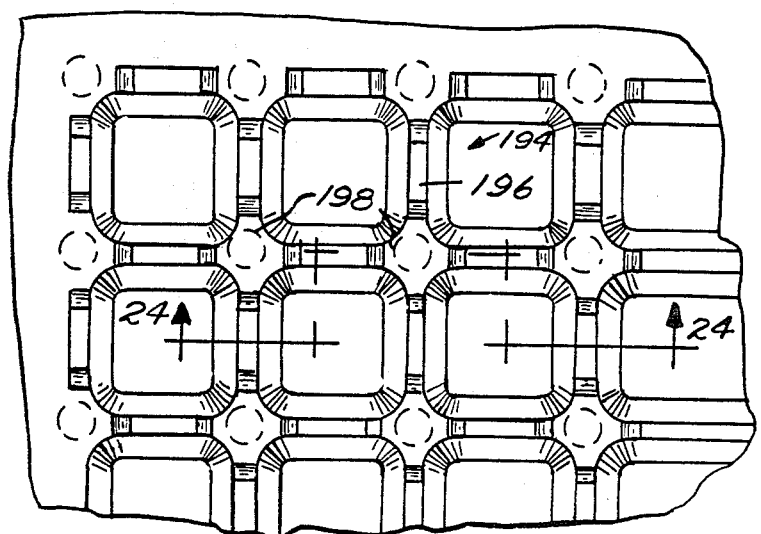
FIG. 28 is a diagrammatic top plan view of a portion of a structural panel structure including an internal truss structure made according to the present invention.
Figure 29:
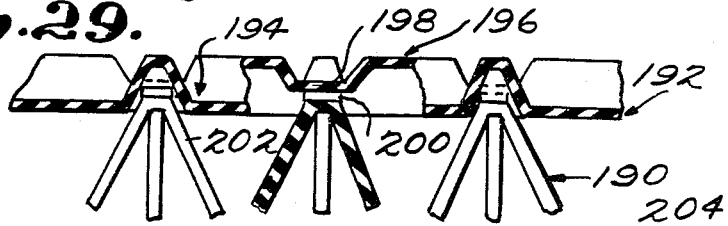
FIG. 29 is a cross-sectional view taken along line 29—29 in FIG. 28.

Turning first to FIGS. 28 and 29 the internal truss structure is diagrammatically indicated at 190 and a portion of the structural sheet is generally indicated at 192. It should be understood that sheet 192 would extend in all directions in a fashion similar to the portion shown to produce a panel of a desired size. Sheet 192 is preferably pressed from sheet metal or could be molded plastic and is provided with a number of alternating depressed and raised areas extending below and above a common middle level. The depressed areas are generally indicated at 194, the raised areas are generally indicated at 196 while the intermediate level areas are generally indicated at 198. It will be noted that the intermediate areas 198 fall so that they can be aligned with the contact pads 200 of the truss structure 190. As is shown by the shading in FIG. 28 the shaped sheet 192 slopes continuously from the bottom of recessed areas 194 up to the top surface of raised areas 196 thus producing a recessed and crossed rib structure or a channelized structure that resists bending and shear forces very well. The upper surface of pads 200 lie against the bottom surface of intermediate areas 198 and can be secured thereto by any convenient means as referred to before such as welding, electromagnetic bonding or by use of mechanical means such as rivets or screws. It should also be pointed out, that the axis of struts 202 intersect the neutral axis of structural sheet 192 which is positioned centrally within intermediate areas 198.

Figure 30:
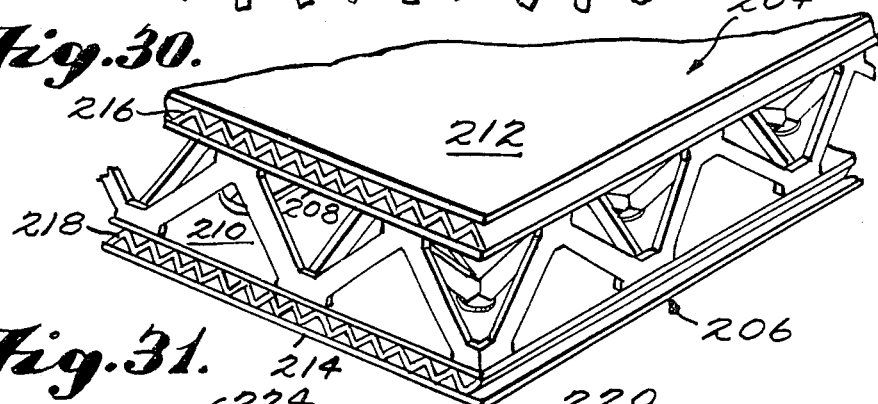
FIG. 30 is a diagrammatic perspective view of another structural panel incorporating a truss structure made according to the present invention.

Turning our attention next to FIG. 30 the truss structure which can be, for example similar to that shown in FIG. 9, is sandwiched between two corrugated panels 204 and 206 with each of the corrugated sheet members 204 and 206 being respectively comprised of an inner sheet 208 and 210, respectively, an exterior sheet, 212 and 214, respectively. Sandwiched between each of the inner and outer sheets is a corrugated member 216 and 218, respectively. The inner and outer sheets in the corrugated panels can be comprised of a variety of materials for instance cardboard, plastic, wood inner and exterior sheets with a plastic or cardboard corrugated insert, metal or other various combinations of these materials. The two surface panel structures are themselves very stiff and when secured to the pad portions of the internal truss structure by gluing, mechanical means or any other convenient method, an extremely strong laminated panel structure is produced. While the corrugations are shown in FIG. 30 as extending in the same direction it should be understood that the corrugations either on the top or bottom of the truss structure could be turned orthogonally with respect to the other. Further, while only a single truss structure is shown as being incorporated between the two corrugated panels, it should be understood that a plurality of truss structures could be secured together prior to having corrugated panels such as indicated at 204 and 206 secured to the outer surfaces.

Figure 31:
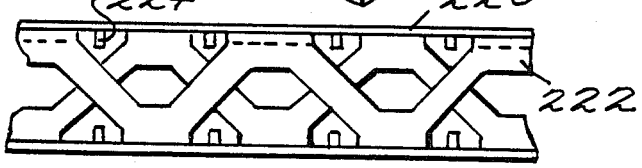
FIG. 31 is a diagrammatic end view of another structural panel incorporating a truss structure made according to the present invention.

Turning next to FIG. 31 the skin or outer sheet 220 secured to one side of the truss indicated at 222 is provided with support ribs 224 which extend lengthwise along sheet 220 within the open V-shaped areas on the surface of truss structure 222. The presence of ribs 224 depending from the inner surface of sheet 220 provide additional buckling resistance when sheet 220 is secured to the support pads on the truss structure 222 and add further strength to the composite structure.

Figure 32:
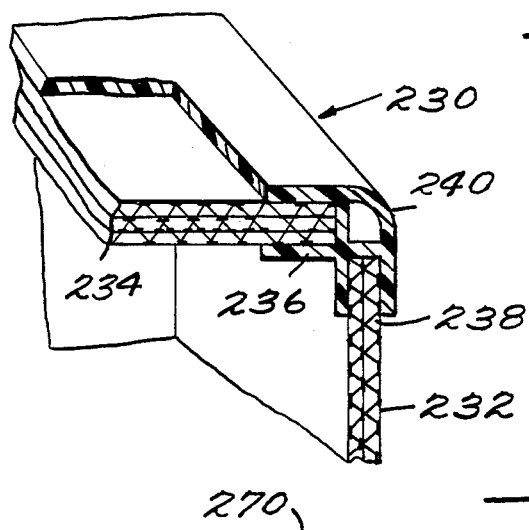
FIG. 32 is a diagrammatic perspective view of a corner member, with portions cut away for clarity, for use with structural panels incorporating truss structures made according to the present invention.

In addition to being able to use the truss structures as building or construction panels for a variety of purposes, I have found that truss structures made according to this invention are uniquely suited in the preparation of containers. Such containers could be comprised with top, bottom and side walls such truss structures together with suitable inner and outer skins secured thereto to define the inner and outer walls of the container. The walls of the container could include a single truss core structure or a plurality of truss core structures with skins again secured to the outer sides of the composite structure. Further, containers could be comprised of top, bottom and side walls where the number of truss structures used could vary throughout the container depending upon the strength requirements of the varius walls or other properties desired in the container itself. FIG. 32 shows an exemplary structure and specifically the corner and side fastening arrangement in order to form the truss structures together into such a container. The container, generally indicated at 230, can be comprised of walls of various thicknesses. Vertical side walls are shown at 232 while horizontal top and bottom walls are indicated at 234. Vertical walls 232 are shown as including two internal truss core members, with an inner and outer skin applied thereto and horizontal walls 234 shown are including three interal truss core structures again with inner and outer skins applied. It should be kept in mind that it is the intent of the present invention to be able to construct the vertical and horizontal walls of a container with that number of truss structures required to accomplish a particular end result. The corner or joining member can be either an integral one-piece device, one formed in a number of one-piece sections. Each section includes two perpendicularly positioned, inwardly opening channels as indicated at 236 and 238. A portion of the structure extends outwardly from each closed end of channel members 236 and 238 meeting to form the exterior edge of the container which is indicated at 240. The edge member could also be comprised of straight side pieces and separate corner elements or alternatively two straight edge members and an integrally molded corner piece. The joining members can be molded or extruded structures could be comprised of a wide variety of materials. The truss panels would be suitably secured within U-shaped channels 236 and 238, preferably by adhesives, although other joining techniques could be used as well. The thickness of the walls defining the legs of the U-shaped channel can vary from container to container again depending upon the strength requirements of the container being designed.

Figure 34:
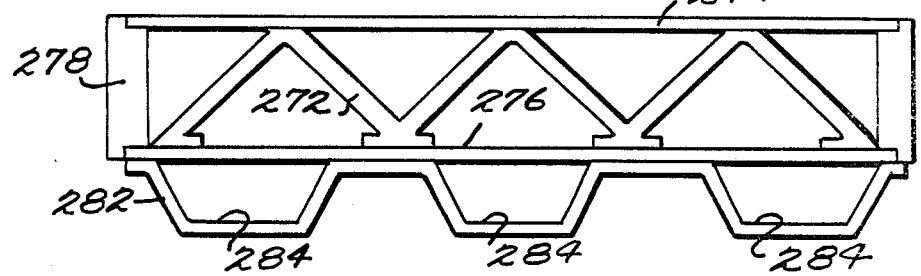
FIG. 34 is a diagrammatic cross-sectional view of a solar collection panel incorporating a truss structure made according to the present invention.
Figure 33:
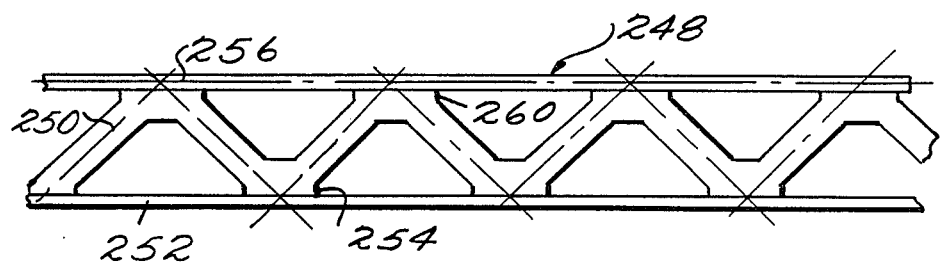
FIG. 33 is a diagrammatic side elevational view of a skylight structure incorporating a truss structure made according to the present invention.
Figure 36:
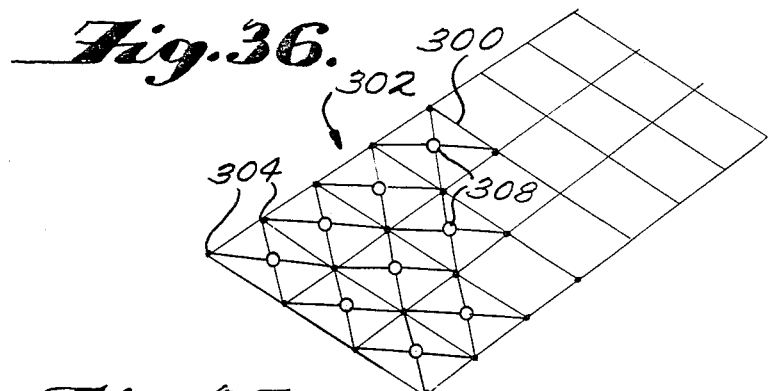
FIG. 36 is a perspective view of another alternative embodiment of the present invention.

As was indicated previously the truss structure used according to the present invention has a wide variety of uses and two alternatives are set forth in FIGS. 33 and 34 respectively. Turning first to FIG. 33 the truss structure generally indicated in 250 which could, for example, be constructed similar to the portion shown in FIG. 9, has a thin glass sheet 252 secured to the bottom pads or junction plates 254 while a thin glass sheet, such as shown at 256, could be secured to the upper pads or junction plates 260. Such a structure could be provided with a suitable edge or could be cut to a proper size and when so constructed would form a lightweight but extremely strong skylight or window structure. Since the truss structure provides a plurality of support points (i.e. pads 254 and 260) extremely thin glass can be used since there is no wide span across which the glass would have to remain unsupported. Accordingly, ⅛ inch glass could be used and yet produce an extremely strong surface to receive weight loads as might be occasioned by snow, ice, or as might be required to resist wind forces. Again it should be pointed out that the axes of the struts forming truss 250 should be constructed such that they intersect the neutral plane of the glass sheet positioned on both the upper and lower surfaces of truss 250. This again ensures that as strong a composite structure as possible can be produced and minimizes the creation of any additional bending moments when force is applied to the composite structure.

Turning next to FIG. 34 a solar collector is indicated generally at 270 which is comprised of a clear or transparent sheet of glass or plastic 274 secured to the upper surface of the truss whereas an opaque sheet or skin or material 276 is secured to the bottom surface of truss 272. In addition, side and end structures indicated at 278 and 280 can be applied so as to extend around the complete periphery of the structure formed of truss 272 and sheets 274 and 276. By forming such a composite structure the space therein could be subjected to a partial so as to make the device an ideal solar collector. Again because of the use of the truss structure 272 it is possible to employ extremely thin outer skins or sheets for members 274 and 276 and because the weight of the truss structure itself is minimized, the weight of the entire composite structure can be kept to very low levels. A channel member 282 can be secured adhesively or otherwise to the exterior surface of opaque sheet 276 and can be formed with fluid channels 284 through which water, air or other fluids could be passed to absorb the heat collected by sheet 276. Again, the axes of the struts forming truss structure 272 would be angled so that they intersect at the neutral plane of both sheets 274 and 276 again minimizing the creation of any bending moments when weight or other stress is applied to the composite structure.

Figure 35:
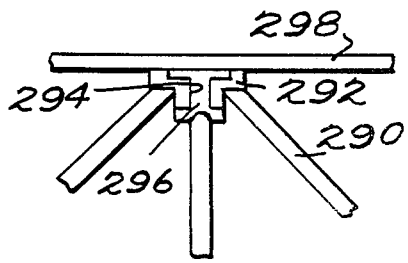
FIG. 35 is a diagrammatic cross-sectional view of a portion of structural panel incorporating a truss structure made according to the present invention showing an exemplary fastening mechanism for securing an outer panel to the truss structure.

In FIG. 35 an alternative embodiment is shown by which exterior sheets could be secured to the truss panels made according to the present invention. Struts 290 could terminate at a pad generally indicated at 292 which could be formed with an opening having a T-shaped cross-section generally indicated at 294. With such a pad structure it would be possible to use rivets to secure outer members to the truss. The rivets could be applied to the outer member by using a jig to properly align them and in that instance, the sheet 298 with rivets in place could be simply secured to the truss panel by fitting the sheet 298 in place and specifically by fitting the ends of rivets 296 within the openings 294 of pads 292. Thereafter, the portion of the rivet extending through pad 292 would be flattened. Alternatively, rivets 296 could be secured within pads 292 and sheets 298 subsequently spot welded or otherwise secured thereto either prior or subsequent to the installation of the truss panel at a desired location.

With respect to FIGS. 36–39 another alternative embodiment of a truss panel is set forth. When molding truss structures according to the present invention it would be possible to construct the mold so that a premade grid 300 or portion thereof could be placed within the mold prior to initiating the molding operation. Thus, when the mold halves are correctly positioned adjacent one another and the plastic material injected therein the truss structure as generally indicated at 302, would result with the grid 300 being integrally molded thereto and be with and secured to the contact areas or pads 304 which appear on and define one face of the truss structure 306. The truss structure 306 may be comprised on any moldable material including plastic or metal such as aluminum and the grid 300 could be preformed from wires, such as aluminum or steel or plastic. Alternatively, the mold cells could be formed so that grid 300 would be simultaneously formed during the molding operation so that grid 300 would be comprised of the same material as the truss structure 306 resulting in a completely integrally formed member 302. The grid 300 could also be comprised of a plurality of rods laid in the mold or it could be comprised of a pre-welded mesh structure depending upon the needs of the product being produced.

Figure 37:
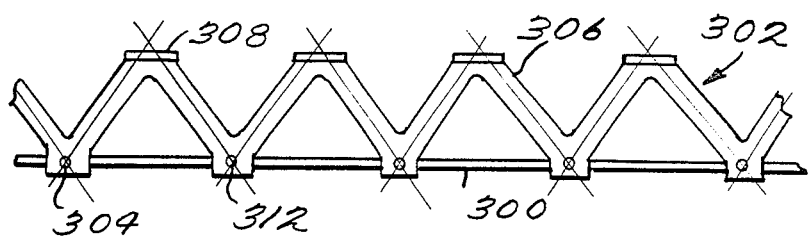
FIG. 37 is a side elevational view of the embodiment shown in FIG. 36.

An end view of the resulting structure appears in FIG. 37 and is shown in a form ready to receive an outer surface member. The axes of the strut are shown as intersection at the point where the grid 300 is secured on one face, as at 312. On the other face, the axes of the struts intersect above pads 308 and at a point substantially equal to the neutral axes of the outer surface member such as sheet 310 in FIG. 34.

Figure 38:
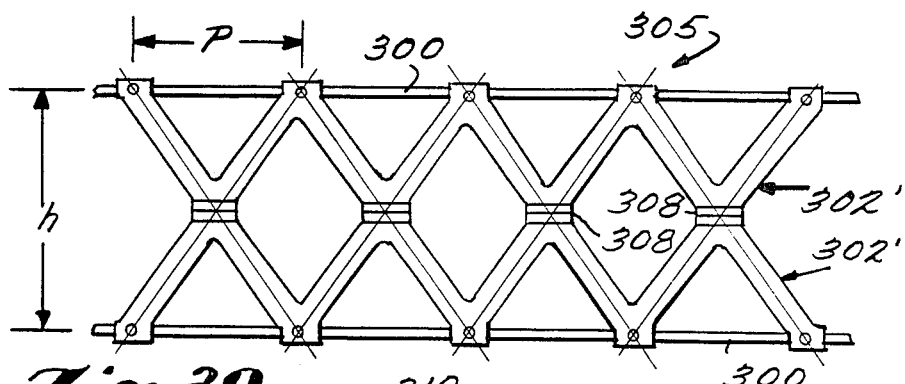
FIG. 38 is a side elevational view of a composite structure formed by superimposing two of the structures shown in FIG. 37.
Figure 39:
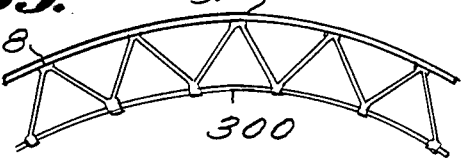
FIG. 39 is a side elevational view of a curved composite structure embodying the structure shown in FIG. 37.

If two of the structures were connected together along contact areas or pads 308, as illustrated in FIG. 38, a double truss member could be formed with grid 300 appearing on two exterior sides. It should be noted, however, that now the axes of the struts are angled to meet at the surface of pads 308 so that the axes of the struts from both truss structures meet at the center of the composite structure. Thus, a composite truss panel structure would be produced and the two members could be welded or adhered together in any of the ways previously discussed which includes the use of epoxy adhesives or electromagnetic bonding techniques. With reference to FIG. 39, the truss members shown in FIG. 37 could be curved following the molding process so as to be formed into the curve structure shown in FIG. 39. Following the correct bending of the truss panel 302 an exterior sheet such as shown at 310 could be secured to contact areas or (paths or pads) 308 with the connection of sheet 310 to the truss panel 302 again being accomplished by adhesive materials, welding or by mechanical means such as rivets (not shown).

It can be seen that by the present invention an improved integral molded truss structure is formed which does not require the use of rivets, bolts or other means for connecting strut beams to surface plates, and hence, substantially reduces the time involved for making the truss structure. Further, it can be appreciated that by altering the angle of the open grooves in the male and female members, the thickness of the truss structure can be varied as well as the strength thereof. The mold can be made of beryllium copper, steel, ceramics or other suitable material or various combinations of materials depending on the materials used to form the truss structure.

The truss structure of the present invention can be utilized to form flat or curved panels utilizing a minimum of material to efficiently attain strength and rigidity. The panels so formed may be used for containers, transportation vehicles, buildings and structures of many kinds.

While the present invention has been described in connection with what are presently conceived to be the most practical and preferred embodiments, it is to be understood that this invention is not to be limited to the disclosed embodiments but on the contrary, is intended to cover various modifications thereof and equivalent arrangements included within the spirit and scope of the appended claims, which scope is to be accorded the broadest interpretation so as to encompass all such equivalent structures and methods.

What is claimed is:

1. A composite panel structure including at least one structural member having a neutral plane secured to one surface of at least one truss member, said at least one truss member having spaced apart top and bottom surfaces each comprised of a plurality of spaced apart individual contact areas, the contact areas forming one of the surfaces being off set from those forming the other surfaces, strut means extending from one surface to the other and arrange obliquely to one another for joining the contact areas in one surface with predetermined contact areas in the other, including a plurality of individual struts extending from each said contact area on one surface toward a like plurality of contact areas on the other surface so that the axis of each of said strut means joining a contact area intersect substantially at the neutral axis of said at least one structural member secured thereto.

2. A composite panel structure as in claim 1 further including another structural member secured on the other side of said truss member.

3. A composite panel structure as in claim 1 wherein said contact areas comprise substantially planar discs.

4. A composite panel structre as in claim 3 wherein said disc is provided with means defining an opening extending there-through and perpendicular to the disc.

5. A composite panel structure as in claim 1 wherein said composite structure includes a plurality of said truss members, each secured to another within the composite structure.

6. A composite panel structure as in claim 1 wherein said contact areas comprise annular bosses.

7. A composite panel structure as in claim 1 wherein said annular bosses are hollow.

8. A composite panel structure as in claim 1 wherein said contact areas comprise upwardly open channels extending at a firm predetermined direction, said structural member comprising a first group of a plurality of individual strip members secured within said channels and extending across said composite structure in said first predetermined direction.

9. A composite panel structure as in claim 8 wherein said upwardly open channels have a substantially U-shaped cross section.

10. A composite panel structure as in claim 9 wherein a like structural member is provided on the opposite of said truss member.

11. A composite panel structure as in claim 9 wherein said strip members comprise rods.

12. A composite structure as in claim 11 wherein said rods are plastic.

13. A composite structure as in claim 11 wherein said rods are metal.

14. A composite structure as in claim 8 further including an additional plurality of individual strip members secured to said plurality of strip members lying within said channels with the second plurality of strip members extending at a predetermined angle across said first group of strip members.

15. A composite structure as in claim 14 wherein said predetermined angle can vary from about 30° to about 90°.

16. A composite structure as in claim 14 wherein a like structural member comprised of said first and second groups of a plurality of strip members are applied to the other said of said truss member.

17. A composite structure as in claim 14 further including a third group of a plurality of individual strip members secured on top of said second group and arranged at a predetermined angle with resect to said second group.

18. A composite structure as set forth in claim 17 wherein said first and third groups extend in the same direction.

19. A composite structure as set forth in claim 17 wherein said first and third groups are positioned with respect to one another at an angle that can vary from about 30° to about 90°.

* * * * *